United States Patent
Wind et al.

(10) Patent No.: US 6,290,790 B1
(45) Date of Patent: Sep. 18, 2001

(54) METHOD FOR REDUCING THE RESISTIVITY OF THE CORROSION-INDUCED OXIDE LAYER, AND APPLICATIONS

(75) Inventors: Jörg Wind, Immenstaad; Felix Nitschke, München, both of (DE)

(73) Assignee: MTU Motoren- und Turbinen-Union Friedrichshafen GmbH, Friedrichshafen (DE)

( * ) Notice: Subject to any disclaimer, the term of this patent is extended or adjusted under 35 U.S.C. 154(b) by 0 days.

(21) Appl. No.: 09/486,965

(22) PCT Filed: Aug. 28, 1998

(86) PCT No.: PCT/DE98/02538

§ 371 Date: Jul. 12, 2000

§ 102(e) Date: Jul. 12, 2000

(87) PCT Pub. No.: WO99/11828

PCT Pub. Date: Mar. 11, 1999

(30) Foreign Application Priority Data

Sep. 3, 1997 (DE) .............................. 197 38 405

(51) Int. Cl.⁷ ...................................... C21D 6/00
(52) U.S. Cl. .................... 148/606; 148/625; 148/628; 29/623.1
(58) Field of Search ..................................... 148/625, 628, 148/606; 29/623.1

(56) References Cited

U.S. PATENT DOCUMENTS 5,565,167    10/1996    Fujimoto et al. ..................... 420/50

FOREIGN PATENT DOCUMENTS

| 178712 | * | 5/1979 | (CS) . |
| 3126706 | | 1/1983 | (DE) . |
| 0353699 | | 7/1990 | (EP) . |
| 56133478 | * | 10/1981 | (JP) . |
| 62030817 | * | 2/1987 | (JP) . |
| 62253732 | * | 11/1987 | (JP) . |
| 04272132 | | 9/1992 | (JP) . |
| 08225892 | | 3/1996 | (JP) . |
| 08311620 | | 11/1996 | (JP) . |
| 09157801 | | 6/1997 | (JP) . |

* cited by examiner

Primary Examiner—Sikyin Ip
(74) Attorney, Agent, or Firm—Crowell & Moring LLP

(57) ABSTRACT

A method for reducing the electrical resistance caused by a corrosion oxide coating at the current-carrying transition of a chromium steel component includes annealing the chromium steel component a temperature of at least 950° C. and removing any oxide coating that develops during said annealing before the component carries current.

9 Claims, No Drawings

METHOD FOR REDUCING THE RESISTIVITY OF THE CORROSION-INDUCED OXIDE LAYER, AND APPLICATIONS

This application is the U.S. national stage application of PCT/DE98/02538, and claims priority of German patent document 197 38 405.4, filed on Sep. 3, 1997.

BACKGROUND AND SUMMARY OF INVENTION

The invention relates to a method for reducing the electrical resistance on the current-carrying transition to a component made of chromium steel due to a corrosion-caused surface layer of oxide on the component. It also has applications of this method as its subject.

In many technical apparatus chromium steel is used for many kinds of components for reasons of strength and corrosion resistance. This material resists corrosion attack by forming a protective chromium oxide coating. The chromium oxide coating is a good barrier against diffusion and thus prevents corrosion attack. Especially in high-temperature applications the chromium oxide coating leads to a great reduction of oxide growth and thus to a lasting protection against the destruction of the material.

If chromium steel, however, is used for electric current carrying components in high-temperature applications in an oxidizing atmosphere, the necessary formation of the chromium oxide coating causes an electrical resistance caused by this coating, which in turn leads to voltage losses and thus to a lowering of the efficiency of the apparatus in question.

An example of a component which is exposed to an oxidizing atmosphere at high temperatures is the cathode current collector of a molten carbonate fuel cell (MCFC).

Molten carbonate fuel cells consist essentially of a porous cathode and a porous anode and a matrix which is imbibed with a molten electrolyte, namely a eutectic mixture containing a lithium carbonate and other alkali carbonates which is in contact with the electrodes. To carry the electrochemically produced current, current collectors are in contact with the cathode and the anode, and they are usually corrugated in order also to form a gas transport space, and namely for carrying air or other oxygen-containing gas at the cathode and a fuel gas at the anode. The fuel cell is operated at a temperature of 500 to 800° C. The cathode current collector is exposed to severe corrosive influences by contact with the oxygen-containing gas and the molten carbonate as well as by the high temperature. In spite of the use of chromium steel, an oxide coating thus forms on the surface of the cathode current collector, which leads to a high resistance to transition between the cathode current collector and the cathode and thus to high power losses in the molten carbonate fuel cell.

To lower this transition resistance, it is proposed according to DE 195 32 791 A1 to apply a noble metal, such as gold or platinum, to the cathode current collector at the points of contact with the cathode. Aside from the high costs of the noble metals, this method has the disadvantage that a diffusion barrier must still be placed between the thin noble metal coating and the chromium steel cathode current collector in order to prevent the diffusion of the noble metal into the chromium steel. Thus several coating steps are necessary.

The invention is addressed to the problem of offering a method whereby the electrical resistance at the transition to a current-carrying chromium steel component due to a surface oxide coating caused by corrosion on the component can be reduced in a simple manner.

This is achieved according to the invention by annealing the chromium steel component a temperature of at least 950° C., and removing any oxide coating that develops during said annealing before the component carries current.

DETAILED DESCRIPTION OF THE INVENTION

By the method of the invention the chromium steel component in question is annealed. The annealing must be performed either with the absolute exclusion of oxygen, or any oxide coating formed by the annealing must be removed entirely at least at the current-carrying transition points, before the component is installed.

A surface oxide coating is necessarily again formed on the current-carrying chromium steel component treated according to the invention when it is used in an oxidizing temperature, especially at high temperatures. Amazingly, however, this oxide coating has a substantially reduced electrical resistance, and indeed the transition resistance compared with a chromium steel component of the same composition, but one that has not been annealed by the method of the invention, is reduced approximately ten-fold.

It is furthermore amazing that, despite the lowering of the electrical transition resistance the oxide coating formed on the component when used in an oxidizing atmosphere resists the attack of corrosion in the same manner as a chromium steel component of the same composition, but one which has not been annealed in an oxygen-free atmosphere according to the invention.

The phenomenon that occurs in the practice of the invention, namely that the surface oxide coating formed when the component is used in an oxidizing atmosphere has on the one hand a high corrosion resistance, but on the other hand a low electrical resistance, cannot be explained. It is true that the grain structure of the chromium steel changes in the annealing, so that it may be thought that less chromium diffuses out of the steel to the surface and thus the formation of chromium oxide at the surface is repressed.

On the other hand, however, it is precisely an oxide coating containing chromium oxide on the surface is considered as a requirement for the anticorrosive properties of a chromium steel.

In other words, it has been found that, in comparison to oxide coatings forming on untreated chromium steel the electrical resistance is surprisingly lowered by the method of the invention by about one order of magnitude. Detailed studies by physical methods show a decided difference in the composition and structure of the oxide coatings formed and those of untreated chromium steel of the same composition. The chromium content in the case of the oxide coating that has grown on the steel treated according to the invention is decidedly lower through the entire coating than the oxide coating grown on the same but untreated steel. The chromium content of the untreated steel and the steel according to the invention itself is equal in volume, so that the cause of the combination of good corrosion resistance and low electrical resistant is not simply a lowering of the chromium content. For is simply the chromium content of the steel is lowered, a lowering of the electrical resistance is indeed obtained, but at the same time a definite deterioration of the corrosion resistance is found. If the treated chromium steel is a steel of the material number 1.4404 (AISI 316 L), the steel treated by the method of the invention shows in comparison with untreated steel a coarse structure and a lowering of the chromium and magnesium content at the surface.

Preferably, a chromium steel with a chromium content of 10 to 22 wt.-%, especially 15 to 19 wt.-%, and with very special preference less than 17 wt.-%.

The other components of the alloy steel can be in weight-percent:

0 to 2% carbon, silicon, phosphorus and/or sulfur 0 to 20% manganese 0 to 10% molybdenum 0 to 20% nickel 0 to 15% cobalt less than 0.5% aluminum, yttrium, titanium and/or cerium.

In particular the content of aluminum, yttrium, titanium and/or cerium should be less than 0.05%, for these elements form oxides with a very high electrical resistance on the surface of the component.

Especially steel of the material number 1.4404 has proven suitable for the method of the invention. This steel has the following composition in weight-percent:

$C \leq 0.030$ $Si \leq 1.00$ $Mn \leq 2.00$ $P \leq 0.045$ $S \leq 0.030$

Cr 16.5–18.5

Mo 2.00–2.50

Ni 11.0–14.0

Remainder iron and impurities caused in production, or $C \leq 9,93$ $Si \leq 1.50$ $Mn \leq 1.50$ $P \leq 0.035$ $S \leq 0.020$ Cr 17.0–20.0

Mo 2.00–3.00

Ni 9.00–13.0

Remainder iron and impurities caused in production.

The annealing of the chromium steel component is performed in the method of the invention at a temperature of at least 950° C., preferably in a temperature range between 1050 and 1400° C., annealing for at least one hour.

To prevent a thick oxide coating from forming during the annealing process, the annealing process must be performed in vacuo or in an oxygen-free atmosphere, for example in pure hydrogen. It is not sufficient to anneal under a common shielding gas, i.e., noble gas, nitrogen or forming gas, because at the annealing temperature the oxygen present, even though in extremely small amounts, leads in any case to the formation of an oxide coating which does not have the desired properties.

Also it is possible to anneal in other atmospheres, or even air, if after this annealing treatment the oxide coating is carefully removed again, at least from the current-carrying transition points on the component.

If the chromium steel components thus treated are used in a temperature range of 500 to 800° C. in an oxidizing atmosphere, an oxide coating forms which is composed of several phases. In this case it is a mixture of many different iron oxides, nickel chromium oxides, and spinels.

Since, as mentioned above, especially the cathode current collectors of molten carbonate fuel cells are exposed to severe corrosive attack, but on the other hand must have a low electrical transition resistance at the points of contact with the cathode, the method of the invention is appropriate, for example, for the production of cathode current collectors of chromium steel for molten carbonate fuel cells.

What is claimed is:

1. A method for making a molten carbonate fuel cell, comprising:

annealing a chromium steel component at a temperature of at least 950° C.;

removing any oxide coating that develops during said annealing, thereby reducing electrical resistance caused by a corrosion oxide coating at a current-carrying transition of the chromium steel component; and installing the chromium steel component as a cathode current collector in a molten carbonate fuel cell.

2. A method according to claim 1, wherein the chromium steel component has a chromium content of 10 to 22 wt.-%.

3. A method according to claim 2, wherein the chromium content is 15 to 19 wt.-%.

4. A method according to claim 1, wherein the chromium steel component contains, in weight percent:

0 to 2% of at least one of carbon, silicon, phosphorus or 0 to 20% manganese;

0 to 20% nickel;

0 to 15% cobalt; and less than 0.5% of at least one of aluminum, yttrium, titanium or cerium.

5. A method according to claim 1, wherein the chromium steel component has material number AISI 316 L.

6. A method according to claim 1, wherein said annealing is at a temperature between 1050 and 1400° C.

7. A method according to claim 1, said annealing is performed for at least one hour.

8. A method according to claim 1, wherein said annealing is performed in vacuo or in an oxygen-free atmosphere.

9. A method according to claim 8, wherein the oxygen-free atmosphere is hydrogen.

* * * * *